United States Patent
Yu et al.

(10) Patent No.: US 12,517,683 B1
(45) Date of Patent: Jan. 6, 2026

(54) INTELLIGENT RELOCATION DESTAGE

(71) Applicant: Dell Products L.P., Round Rock, TX (US)

(72) Inventors: Rong Yu, West Roxbury, MA (US); Lixin Pang, Needham, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/820,867

(22) Filed: Aug. 30, 2024

(51) Int. Cl.
*G06F 3/06* (2006.01)
(52) U.S. Cl.
CPC ............ *G06F 3/0659* (2013.01); *G06F 3/061* (2013.01); *G06F 3/067* (2013.01)
(58) Field of Classification Search
None
See application file for complete search history.

(56) References Cited

U.S. PATENT DOCUMENTS

2022/0300420 A1\* 9/2022 Ivester ................ G06F 11/2053

\* cited by examiner

*Primary Examiner* — Scott C Sun
(74) *Attorney, Agent, or Firm* — Daly, Crowley, Mofford & Durkee, LLP.

(57) ABSTRACT

According to aspects of the disclosure, a method is provided, comprising: identifying a first front-end (FE) track that is arranged to cache data associated with one or more write requests, the first FE track being managed by a frontend of a storage system; detecting whether the first FE track is subject to a sequential write or a random write; generating a hint indicating whether the first FE track is subject to a sequential write or a random write; providing the hint from the frontend of the storage system to a destaging service of the storage system; selecting, by the destaging service of the storage system, a type of write operation for destaging the first FE track, the selected type of write operation being one of an in-place write or a relocation write; destaging the first FE track by executing the selected type of write operation.

20 Claims, 12 Drawing Sheets

BE TRACK (128K) _165_

RAID SLICE (4+1 RAID ARRAY) _166_
- BE TRACK 1 (stored in SSD1)
- BE TRACK 2 (stored in SSD2)
- BE TRACK 3 (stored in SSD3)
- BE TRACK 4 (stored in SSD4)

RAID SLICE (4+1 RAID ARRAY) _167_
- BE TRACK 5 (stored in SSD1)
- BE TRACK 6 (stored in SSD2)
- BE TRACK 7 (stored in SSD3)
- BE TRACK 8 (stored in SSD4)

FIG. 1D

EXAMPLE OF AN IN-PLACE WRITE
<TIME = T1>
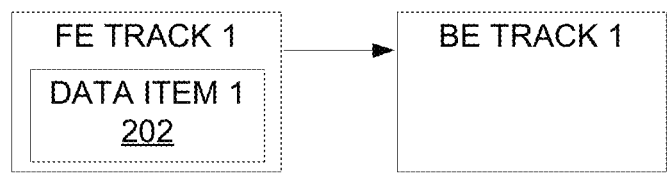
<TIME = T2>
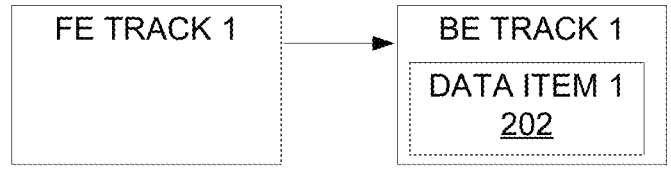
<TIME = T3>
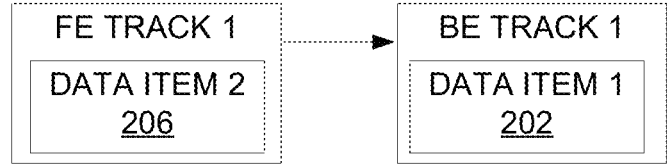
<TIME = T4>
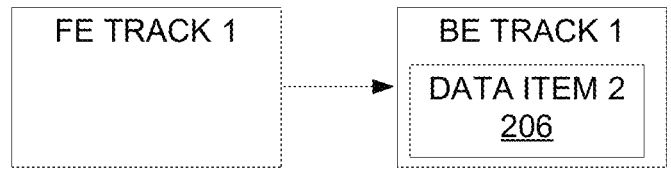
FIG. 1G EXAMPLE OF A RELOCATION WRITE
<TIME = T1>
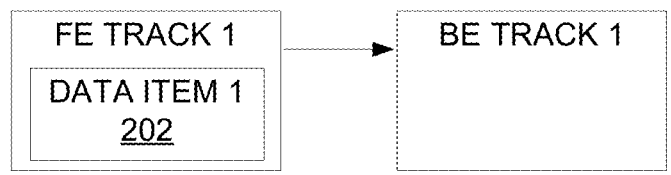
<TIME = T2>
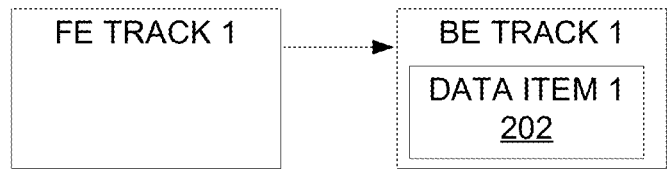
<TIME = T3>
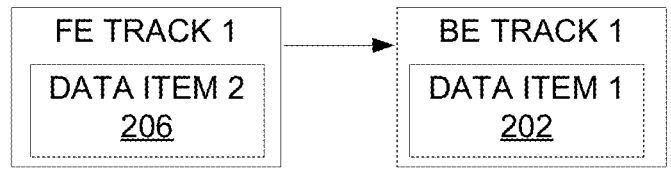
<TIME = T4>
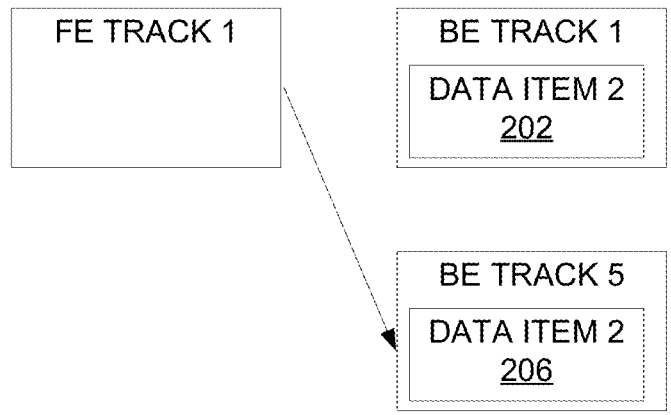
FIG. 1H

INTELLIGENT RELOCATION DESTAGE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: identifying a first front-end (FE) track that is arranged to cache data associated with one or more write requests, the first FE track being managed by a frontend of a storage system; detecting whether the first FE track is subject to a sequential write or a random write; generating a hint indicating whether the first FE track is subject to a sequential write or a random write; providing the hint from the frontend of the storage system to a destaging service of the storage system; selecting, by the destaging service of the storage system, a type of write operation for destaging the first FE track, the selected type of write operation being one of an in-place write or a relocation write; and destaging the first FE track by executing the selected type of write operation, wherein destaging the first FE track by executing an in-place write includes identifying a first backend (BE) track that is currently mapped by a metadata object to the first FE track and destaging the first FE track by using the first BE track, and wherein destaging the first FE track by executing a relocation write includes: replacing, in the metadata object, a mapping between the first FE track and the first BE track with a mapping between the first FE track and a second BE track and destaging the first FE track by using the second BE track.

According to aspects of the disclosure, a system is provided, comprising: a memory; and at least one processor that is operatively coupled to the memory, the at least one processor being configured to perform the operations of: identifying a first front-end (FE) track that is arranged to cache data associated with one or more write requests, the first FE track being managed by a frontend of a storage system; detecting whether the first FE track is subject to a sequential write or a random write; generating a hint indicating whether the first FE track is subject to a sequential write or a random write; providing the hint from the frontend of the storage system to a destaging service of the storage system; selecting, by the destaging service of the storage system, a type of write operation for destaging the first FE track, the selected type of write operation being one of an in-place write or a relocation write; and destaging the first FE track by executing the selected type of write operation, wherein destaging the first FE track by executing an in-place write includes identifying a first backend (BE) track that is currently mapped by a metadata object to the first FE track and destaging the first FE track by using the first BE track, and wherein destaging the first FE track by executing a relocation write includes: replacing, in the metadata object, a mapping between the first FE track and the first BE track with a mapping between the first FE track and a second BE track and destaging the first FE track by using the second BE track.

According to aspects of the disclosure, a non-transitory computer-readable medium storing one or more processor-executable instructions, which, when executed by at least one processor, cause the at least one processor to perform the operations of: identifying a first front-end (FE) track that is arranged to cache data associated with one or more write requests, the first FE track being managed by a frontend of a storage system; detecting whether the first FE track is subject to a sequential write or a random write; generating a hint indicating whether the first FE track is subject to a sequential write or a random write; providing the hint from the frontend of the storage system to a destaging service of the storage system; selecting, by the destaging service of the storage system, a type of write operation for destaging the first FE track, the selected type of write operation being one of an in-place write or a relocation write; and destaging the first FE track by executing the selected type of write operation, wherein destaging the first FE track by executing an in-place write includes identifying a first backend (BE) track that is currently mapped by a metadata object to the first FE track and destaging the first FE track by using the first BE track, and wherein destaging the first FE track by executing a relocation write includes: replacing, in the metadata object, a mapping between the first FE track and the first BE track with a mapping between the first FE track and a second BE track and destaging the first FE track by using the second BE track.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1D is a diagram of an example of different units of data storage, according to aspects of the disclosure;

FIG. 1G is a diagram of an example of an in-place write, according to aspects of the disclosure;

FIG. 1H is a diagram of an example of an in-place write, according to aspects of the disclosure;

DETAILED DESCRIPTION

Figure 1A:
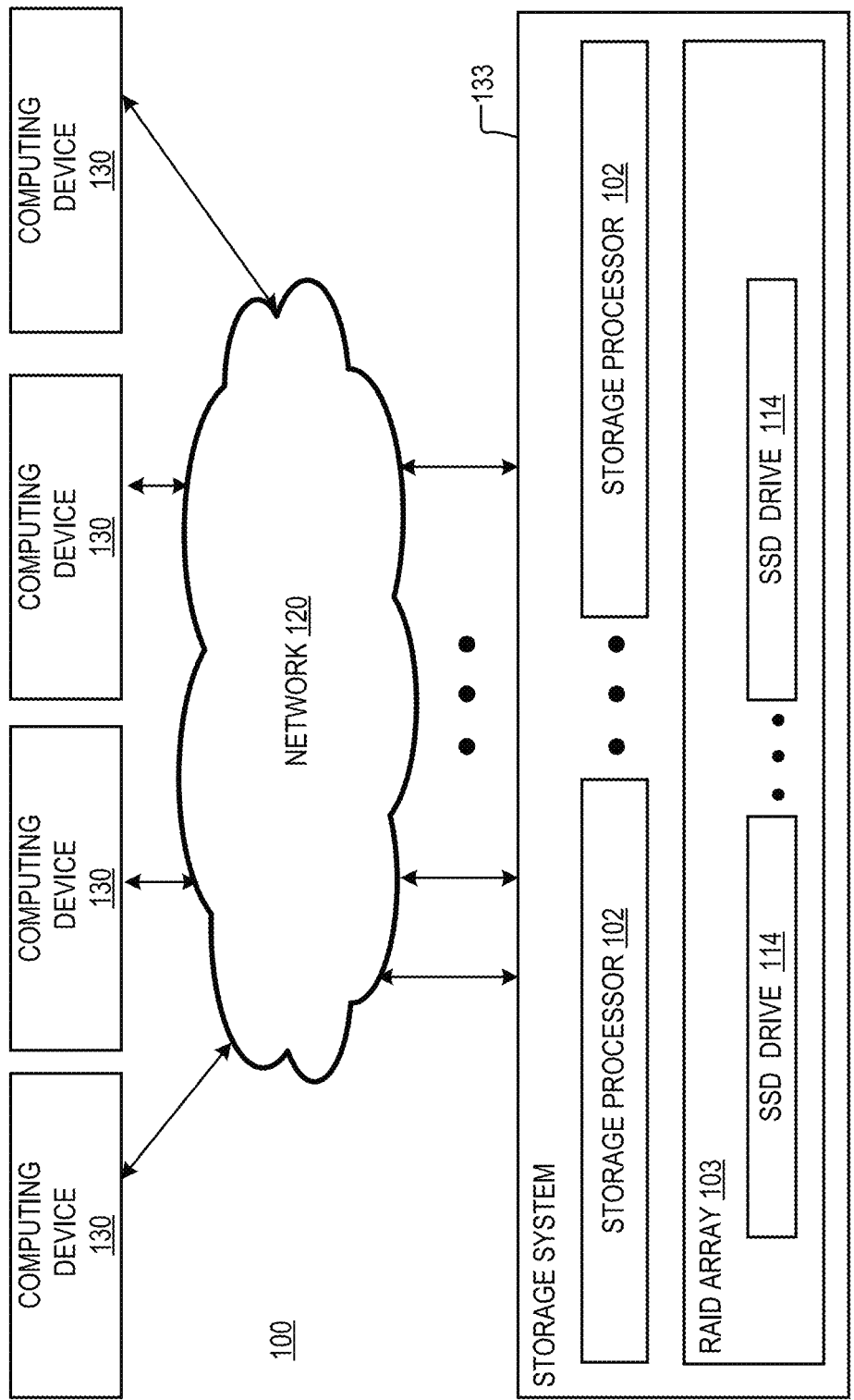
FIG. 1A is a diagram of an example of a system, according to aspects of the disclosure.

FIG. 1A is a diagram of an example of a system 100, according to aspects of the disclosure. As illustrated, system 100 may include a storage system 133 that is coupled to a plurality of computing devices 130 via a communications network 120. Each of the computing devices 130 may include a smartphone, a desktop, a server, a laptop, and/or any other device that might be used by a user to store and retrieve data from the storage system 133. Each of the computing devices may be the same or similar to the computing device 500, which is discussed further below with respect to FIG. 5. The communications network 120 may include one or more of the Internet, a local area network (LAN), a wide area network (WAN), an InfiniBand network, a mobile data network, etc. Storage system 133 may include a plurality of storage processors 102 and a plurality of storage devices 114. In some implementations, each of the storage devices 114 may include a Solid-State Drive (SSD), a Non-Volatile Memory Express (NVME) device, a hard disk, and/or any other suitable type of storage device. According to the present example, the storage devices are arranged in a RAID array 103. Each of the storage processors 102 may include a computing device, such as the computing device 500, which is discussed further below with respect to FIG. 5. Each of the storage processors 102 may be configured to receive I/O requests from the computing devices 130 and execute the received requests by reading or writing data to the RAID array 103.

Figure 1B:
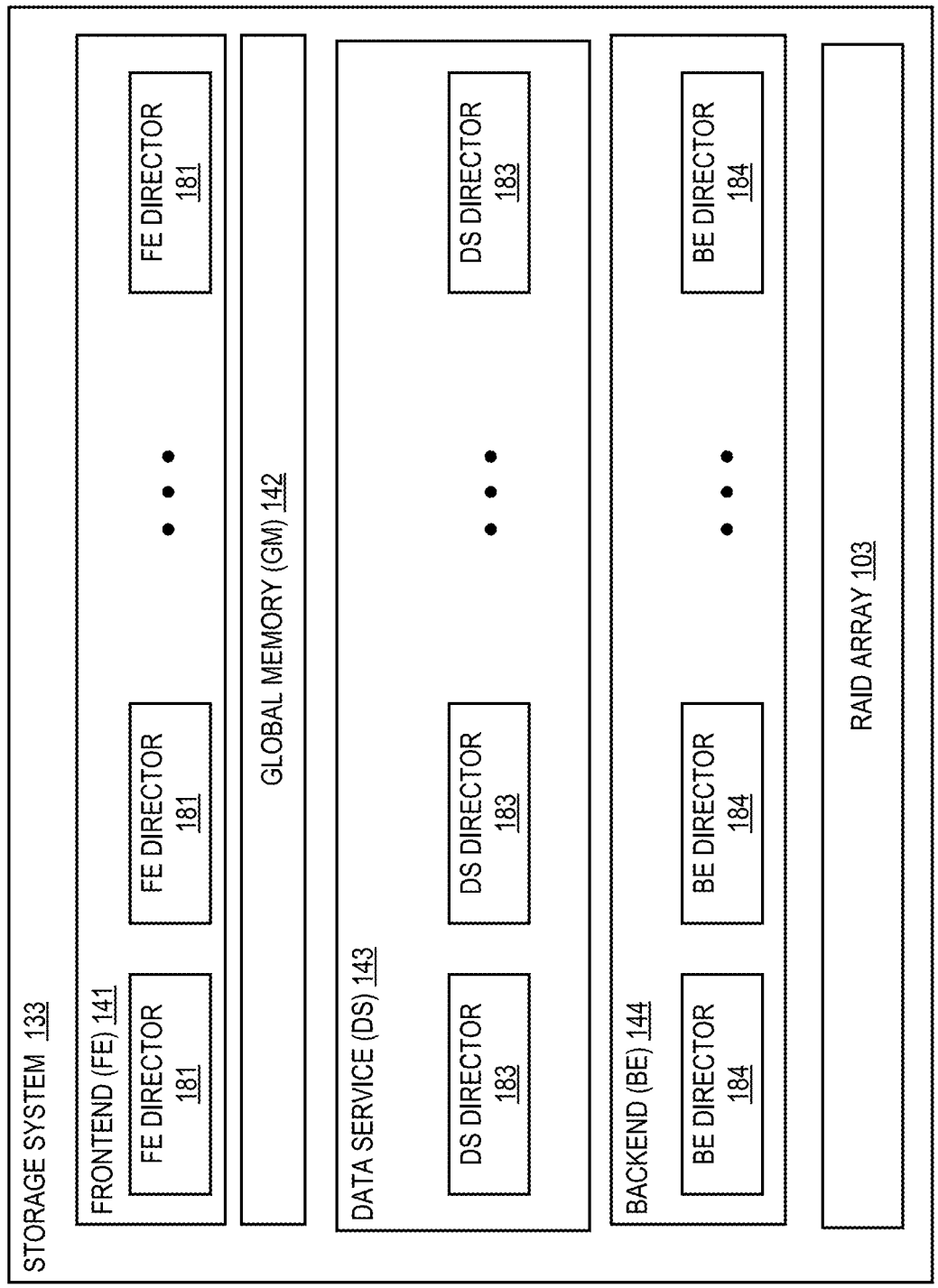
FIG. 1B is a diagram of an example of a storage system, according to aspects of the disclosure.

FIG. 1B is a diagram illustrating aspects of the operation of storage system 133, according to aspects of the disclosure. As illustrated, the storage system 133 may include a frontend (FE) 141, a global memory (GM) 142, a data service (DS) 143, and a backend (BE) 144. FE 141 may be comprised of one or more FE directors 181. Each FE director 181 may include one or more processes that are executed on a respective one of the storage processors 102. DS 143 may be comprised of one or more DS directors 183. Each DS director 183 may include one or more processes that are executed on a respective one of the storage processors 102. BE 144 may be comprised of one or more BE directors 184. Each BE director 184 may include one or more processes that are executed on a respective one of the storage processors 102. GM 142 includes a shared memory space that is used by storage system 133 for caching data. GM 142 may include a plurality of memory portions that are united in the same address space, wherein each of the plurality of memory portions is part of the volatile memory (e.g., DRAM) of a different respective one of the storage processors 102. Although, in the present example, GM 142 is used to cache data, it will be understood that alternative implementations are possible in which GM 142 is replaced with a different type of cache memory. In other words, the present disclosure is not limited to using any specific type of cache memory.

Figure 1C:
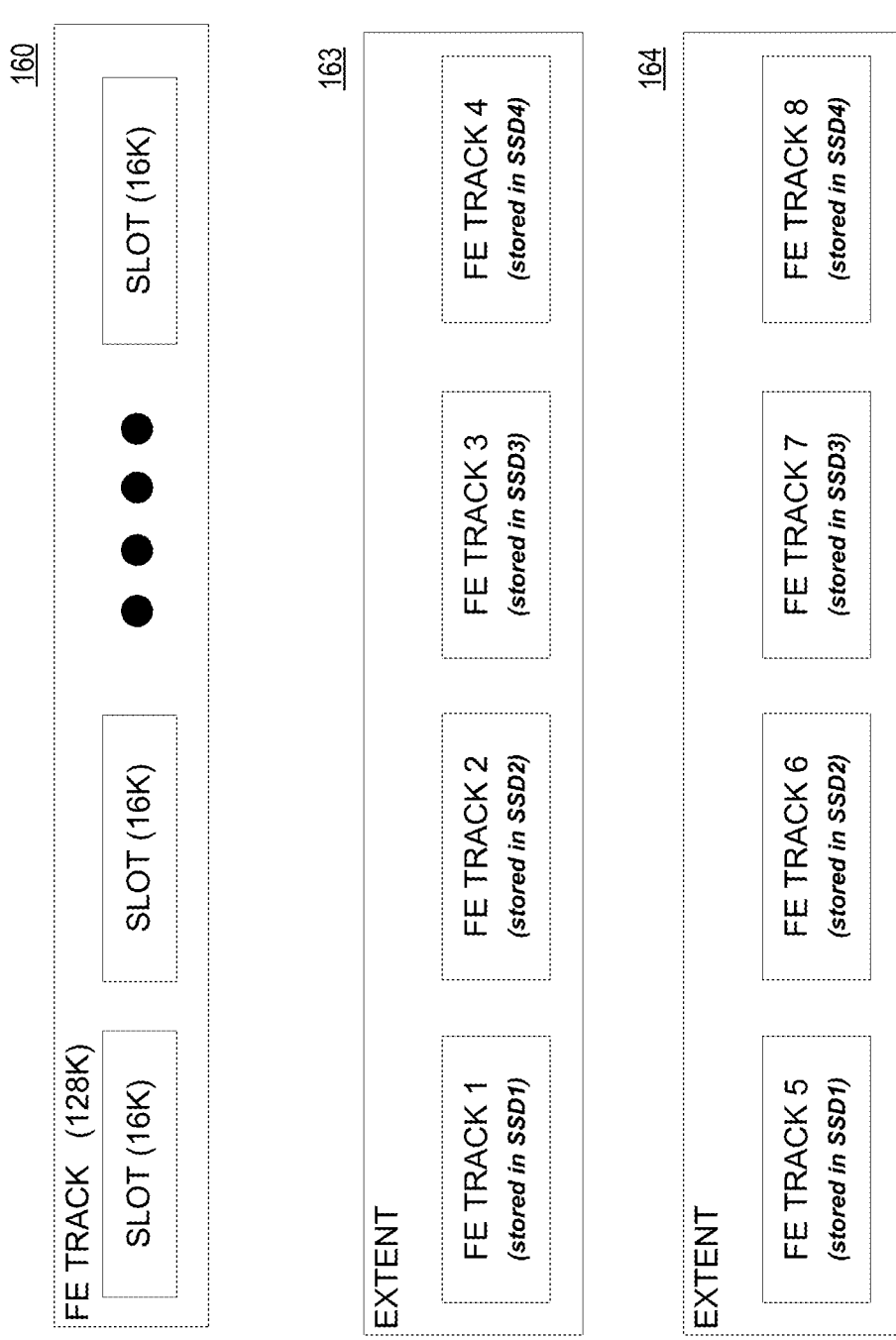
FIG. 1C is a diagram of an example of different units of data storage, according to aspects of the disclosure.

FIG. 1C shows an example of an FE track 160. The term "frontend track" as used throughout the disclosure refers to a data block, or a unit of data storage, in which data is cached into the GM 142. According to the present example, the FE track 160 is 128K in size and it consists of a plurality of slots that are each 16K in size. However, in an alternative implementation, the BE track 16 may have a mix of 64K and 16K slots. Stated succinctly, the present disclosure is not limited to any specific implementation of the FE track 160 and/or the slots that form the FE track. The term "slot" as used herein refers to a smaller unit of data storage that is part of an FE track. Further shown in FIG. 1C are extents 163 and 163. Extent 163 includes FE tracks 1-4 and extent 164 includes FE tracks 5-8. As used herein, the term "extent" refers to a set of sequential FE tracks (i.e., FE tracks having sequential addresses). According to the present example, any of FE tracks 1-8 is the same or similar to FE tack 160.

FIG. 1D shows an example of a BE track 165. The term "backend track" as used throughout the disclosure refers to a data block, or a unit of data storage, in which data is stored in the RAID array 103. According to the present example, the BE track 165 is 128K in size. However, the present disclosure is not limited to any specific implementation of the BE track 165. According to the present example, the BE track 165 is not divided into slots as is the case with the FE track 160, which is discussed above with respect to FIG. 1C. However, the present disclosure is not limited thereto, and in some implementations, the BE track 165 may be divided into slots. Stated succinctly, the present disclosure is not limited to any specific implementation of the BE track 165. The term "slot" as used herein refers to a smaller unit of data storage that is part of a BE track. Further shown in FIG. 1D are RAID slices 166 and 167. RAID slice 166 includes BE tracks 1-4 and RAID slice 167 includes BE tracks 5-8. As is well-known in the art, the term "RAID slice" refers to a logical segment or partition of storage within a RAID array. Although, the example of FIG. 1D assumes a 4+1 RAID array, it will be understood that the present disclosure is not limited to any specific type of RAID configuration. Furthermore, it will be understood that the present disclosure is not limited to any specific size of the FE tracks and the BE tracks that are used by storage system 133. The mapping between BE tracks and corresponding RAID slices may be established by a data structure that is stored in the memory of one or more storage processors 102 or elsewhere in storage system 133. The mapping may be static or it may change from time to time. The present disclosure is not limited to any specific method for implementing the mapping. Furthermore, according to the present example, each of the FE tracks is given a unique address that belongs to a frontend track address space maintained at FE 141 and each of the BE tracks is given a unique address that belongs to a backend track address space that is maintained at BE 144.

Figure 1E:
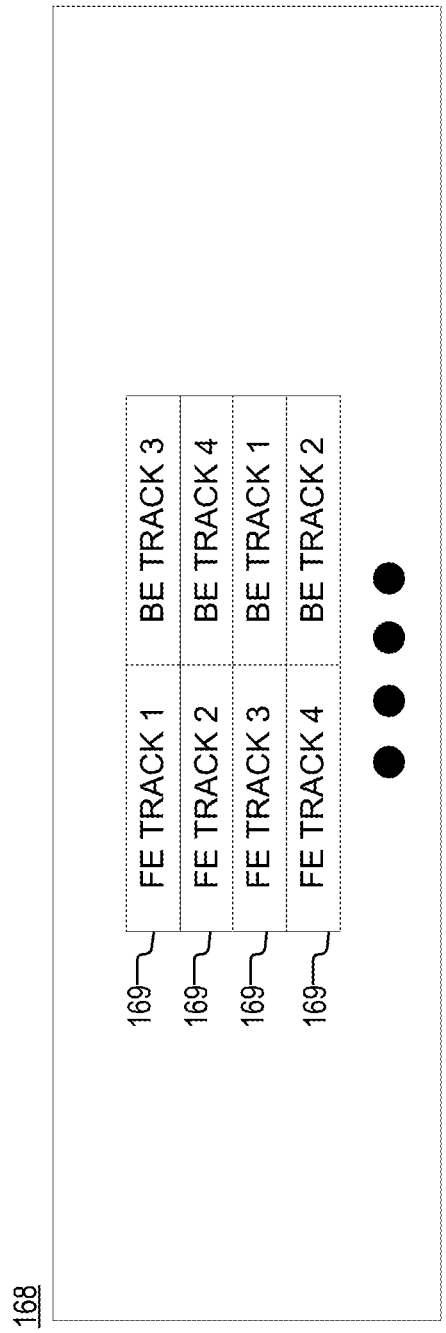
FIG. 1E is a diagram of an example of a data structure, according to aspects of the disclosure.

FIG. 1E is a diagram of an example of a data structure 168, according to aspects of the disclosure. According to the present example, data structure 168 includes a plurality of entries 169. Each entry 169 includes an identifier (e.g., an address) of a respective FE track in GM 142 and an identifier (e.g., an address) of a respective backend track. In other words, data structure 168 is a map that maps each of the plurality FE tracks in GM 142 to a different corresponding one of the backend tracks. The data structure 168 may be stored in the memory of one or more of storage processors 102 and/or elsewhere in the storage system 133. The present disclosure is not limited to any specific implementation of data structure 168. Data structure 168 may be implemented as a single file, a plurality of files, a single database object, a plurality of database objects, and/or in any other suitable manner.

Figure 1F:
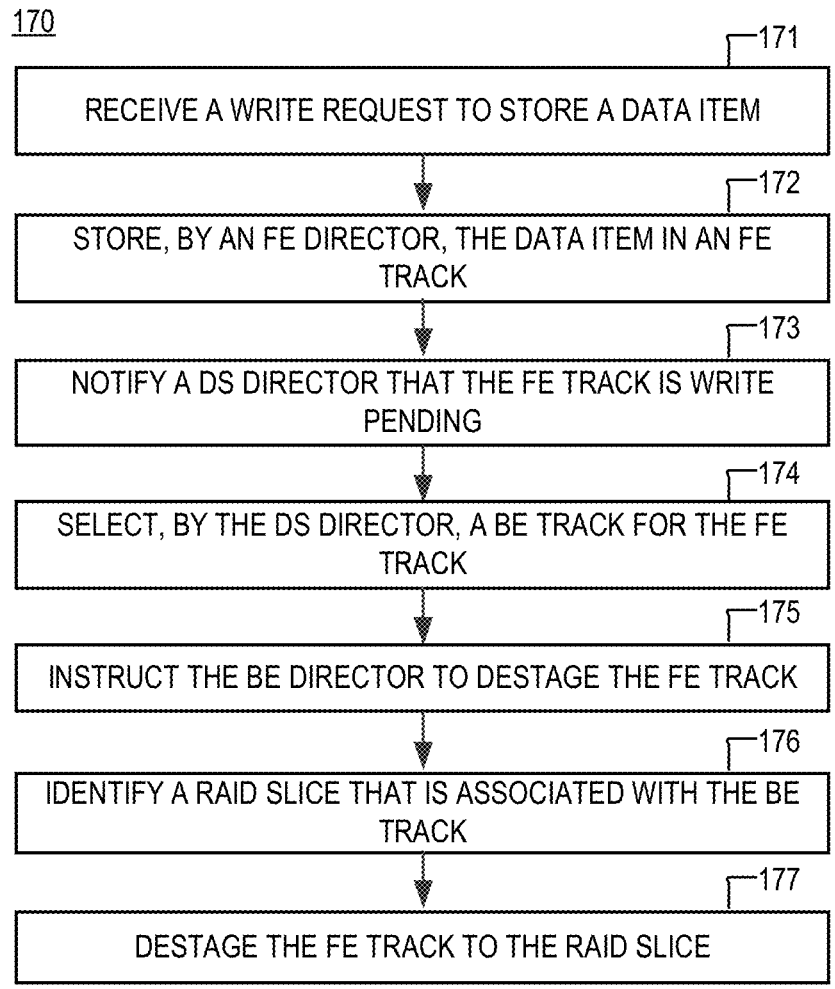
FIG. 1F is a flowchart of an example of a flowchart, according to aspects of the disclosure.

FIG. 1F is a flowchart of an example of a process 170, according to aspects of the disclosure. FIG. 1F is provided to illustrate one example of how FE 141, DS 143, and BE 144 might interact with each other to execute a write request that is received at storage system 133. According to the present example, process 1F is performed by one of the FE directors 181 (hereinafter "the given FE director"), a given one of the DS directors 183 (hereinafter "the given DS director"), and one of the BE directors 184 (hereinafter "the given BE director"). However, the present disclosure is not limited to any specific entity performing process 170.

At step 171, storage system 133 receives a write request. The write request asks storage system 133 to store a data item in the RAID array 103. At step 172, the given FE director stores the data item in one of the FE tracks in GM 142. At step 173, the given FE director notifies the given DS director that the FE track is write pending. At step 174, the given DS director selects a BE track that corresponds to the FE track. At step 175, the given DS director instructs the given BE director to destage the data item from GM 142 into storage system 133, and provides the given BE director with an identifier of the BE track selected at step 174. At step 176 the given BE director identifies a RAID slice in RAID array 103 that corresponds to the BE track (selected at step 174). At step 177, the given BE director destages the FE track by copying the data item from the FE track into the identified RAID slice.

The example of FIG. 1F describes the processing of a single FE track. However, in practice, the given DS director will process a plurality of FE tracks at the same time. Specifically, the given DS direct may accumulate (or identify) FE tracks currently cached in GM 142 and waiting to be destaged to RAID array 103 (i.e., write pending FE tracks). For example, in a 4+1 RAID configuration the given DS director may accumulate (or identify) 4 write pending FE tracks. In a 7+1 RAID configuration, the given DS director may accumulate (or identify) 7 write pending tracks, and so forth. Next, the given DS director may identify the respective BE track that is mapped to each of the accumulated (or identified) FE tracks. Next, the DS director may combine the identified BE tracks into a single RAID slice (or a single RAID slice definition). Next, the given DS director may construct (or generate) a write request, which describes the RAID slice (and/or contains the RAID slice definition). And finally, the given DS director may provide the write request to BE 144, where it would be executed by one of the BE directors 184, and the data stored in the accumulated (or identified) FE tracks would be stored in the RAID array 103 as a result.

In the example of FIG. 1F, executing the write operation involves selecting a BE track that is going to receive the data item that is associated with the write request. Depending on what BE track is selected, the write request may be completed by performing an in-place write or a relocation write. Under the nomenclature of the present disclosure, when an in-place write is performed, the BE track that is selected at step 174 is the one that is currently mapped by data structure 168 to the FE track where the data item is stored. On the other hand, when a relocation write is performed, the data structure 168 is updated to map the FE track to a new BE track, and the new BE track is selected to receive the data item.

In general, when a write request is executed by storage system 133, the storage system 133 is required to perform some overhead work. In this example, the overhead work may include re-calculating the correction code (e.g., a CRC code) for the RAID slice where the data item is stored. As noted above, a RAID slice may include a plurality of tracks. According to the present disclosure, it is determined that when a track is part of a sequential write, it is more efficient to perform an in-place write. On the other hand, when a track is part of a random write, it is more efficient to perform a relocation write.

Consider an example in which, during a time window TW one or more tracks can be written to a RAID slice, and at the end of the time window TW, the correction code for the RAID slice needs to be recalculated. In this example, if only one track needs to be written to the RAID slice, this track is considered to be a "random write." On the other hand, if more than 7 tracks need to be written to the RAID slice, this is considered a sequential write.

Now consider that there are 5 (or another number) of writes pending, wherein each write pending is a random write that is associated with a different corresponding FE track that needs to be destaged to RAID array 103. In this example, if the writes are executed using in-place write, this means that each FE track would be stored in a different RAID slice and 5 different error codes would need to be calculated at the end of the time window TW. On the other hand, if a relocation write is performed, the five FE tracks can be written to the same RAID slice and only one correction code needs to be calculated. As can be readily appreciated, calculating one correction code requires fewer computing resources than calculating five different correction codes and is therefore more efficient.

According to the present disclosure, a technique is disclosed that improves the efficiency of storage systems by optimizing the way in which FE tracks are destaged to a RAID array (or any other type of physical storage medium). The technique involves the provision of a hint for any FE track that is stored in cache and waiting to be destaged to a RAID array. The hint may be a bit that is indicative of whether the track is subject to a sequential write or a random write. If the bit is set to a first value (e.g., '1') this means that the track is subject to a sequential write. If the bit is set to a second value (e.g., '0') this means that the track is subject to a random write. When the hint is set to the first value, the track is destaged using an in-place write. Otherwise, when the hint is set to the second value, the track is destaged using a relocation write. As used herein, the phrase "destaging a track" refers to copying the contents of the track from GM 142 to RAID array 103. When the contents is copied, the track becomes available to receive new data.

In one particular implementation, for a given track that is waiting in cache (e.g., GM 142), the hint may be calculated by the FE director 181 which is managing the track. The hint may be then provided to the DS director 183 who would handle the destaging of the track. When the hint is set to the first value, the DS director 183 may query data structure 168 to identify the BE track that is currently mapped to the FE track, and destage the FE track to this BE track. On the other hand, when the hint is set to the second value, the DS director 183 may select a new BE track and update the data structure 168 to map the FE track to the new BE track, after which the DS director may destage the FE track to the new BE track. In this example, the destaging of the FE track may involve issuing an instruction to one of the BE directors to copy the FE track from GM 142 to a raid slice that is currently mapped to the BE track associated with the FE track by data structure 168.

FIG. 1G is a diagram of an example of a process for executing an in-place write. According to the example, at time T1, a data item 202 is stored in FE track #1. At time T2, a search of data structure 168 is performed to determine that FE track 1 is mapped to BE track 1, and data item 202 is destaged from FE track 1 to the physical location (in RAID array 103) that is mapped to BE track 1. At time T3, a data item 206 is stored in FE track #1. At time T4, a search of data structure 168 is performed to determine that FE track 1 is mapped to BE track 1, and data item 206 is destaged from FE track 1 to the physical location (in RAID array 103) that is mapped to BE track 1. As a result of this arrangement data item 202 is overwritten with data item 206.

FIG. 1H is a diagram of an example of a process for executing a relocation write. According to the example, at time T1, a data item 202 is stored in FE track #1. At time T2, a search of data structure 168 is performed to determine that FE track 1 is mapped to BE track 1, and data item 202 is destaged from FE track 1 to the physical location (in RAID array 103) that is mapped to BE track 1. At time T3, a data item 206 is stored in FE track #1. At time T4, data structure 168 is updated to map FE track 1 to BE track 5 and the binding between FE track and BE track 1 is removed from data structure 168. Afterwards, data item 206 is destaged from FE track 1 to the physical location (in RAID array 103) that is mapped to BE track 5.

According to the example of FIGS. 1G-H, data items 202 and 206 are stored in RAID array 103 as part of executing write operations that involve the storage of data in the same logical block address (LBA). In the example of FIG. 1G, the LBA is mapped to the physical location in RAID array 103 that corresponds to BE track. In the example of FIG. 1H, the metadata in storage system 133 may be updated to map the LBA to the physical location in RAID array 1-3 to the physical location in RAID array 103 that corresponds to BE track 5.

Figure 2:
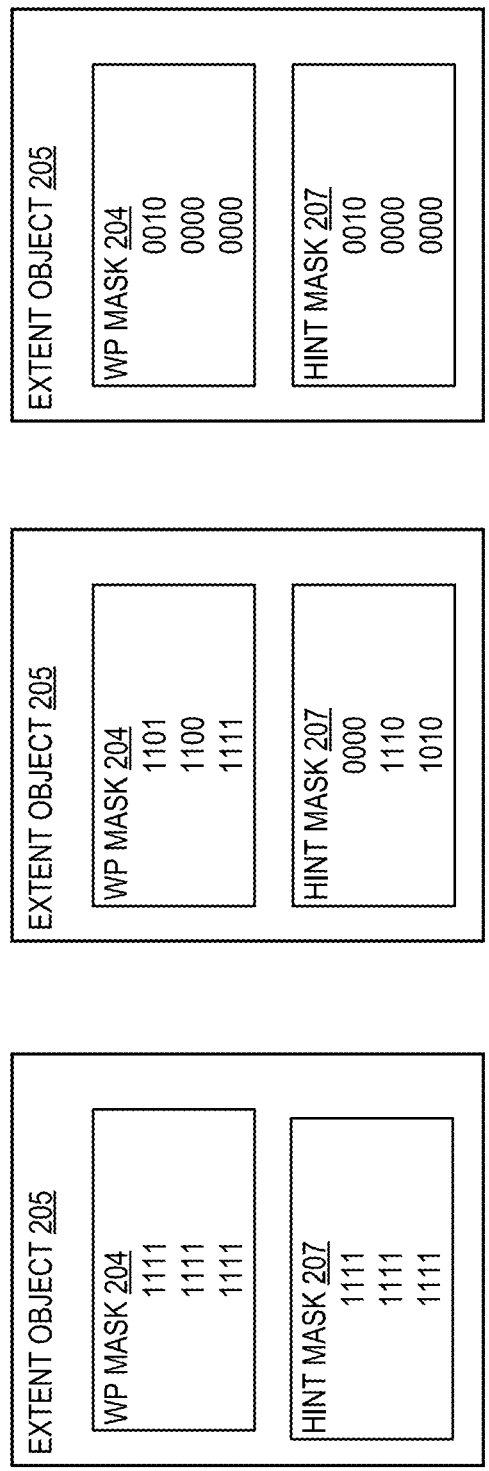
FIG. 2 is a diagram of an example of a set of extent objects, according to aspects of the disclosure.

FIG. 2 is a diagram of an example of extent objects 205. Each of extent objects 205 may correspond to a different extent in storage system 133. Each of extent objects 205 may be used by the FE 141 of storage system 133 to manage the destaging of data from the GM 142 to the RAID array 103. According to the example of FIG. 2, each of extent objects 205 includes a write-pending (WP) mask 204 and a hint mask 207. Each WP mask 204 may include a plurality of bits, where each bit corresponds to a different FE track in the extent associated with the extent object 205 of which the mask 204 is part. If the bit is set to '1', this means that there is a write pending for the FE track and data that is stored in the FE track needs to be destaged to RAID array 103. If the bit is set to '0' this means that no new has been stored in the track and is waiting to be destaged. Each hint mask 207 may include a plurality of bits, where each bit is a hint that corresponds to a different FE track in the extent associated with the extent object 205 of which the mask 207 is part. If the bit is set to '1', this means that the FE track associated with the bit is subject to a sequential write (provided that there is a write pending for the track). If the bit is set to '0', this means that the FE track associated with the bit is subject to a random write (provided that there is a write pending for the track). As noted above, the bits in each mask 207 constitute the "hints" which are generated by FE 141 for the FE tracks in GM 142.

Figure 3:
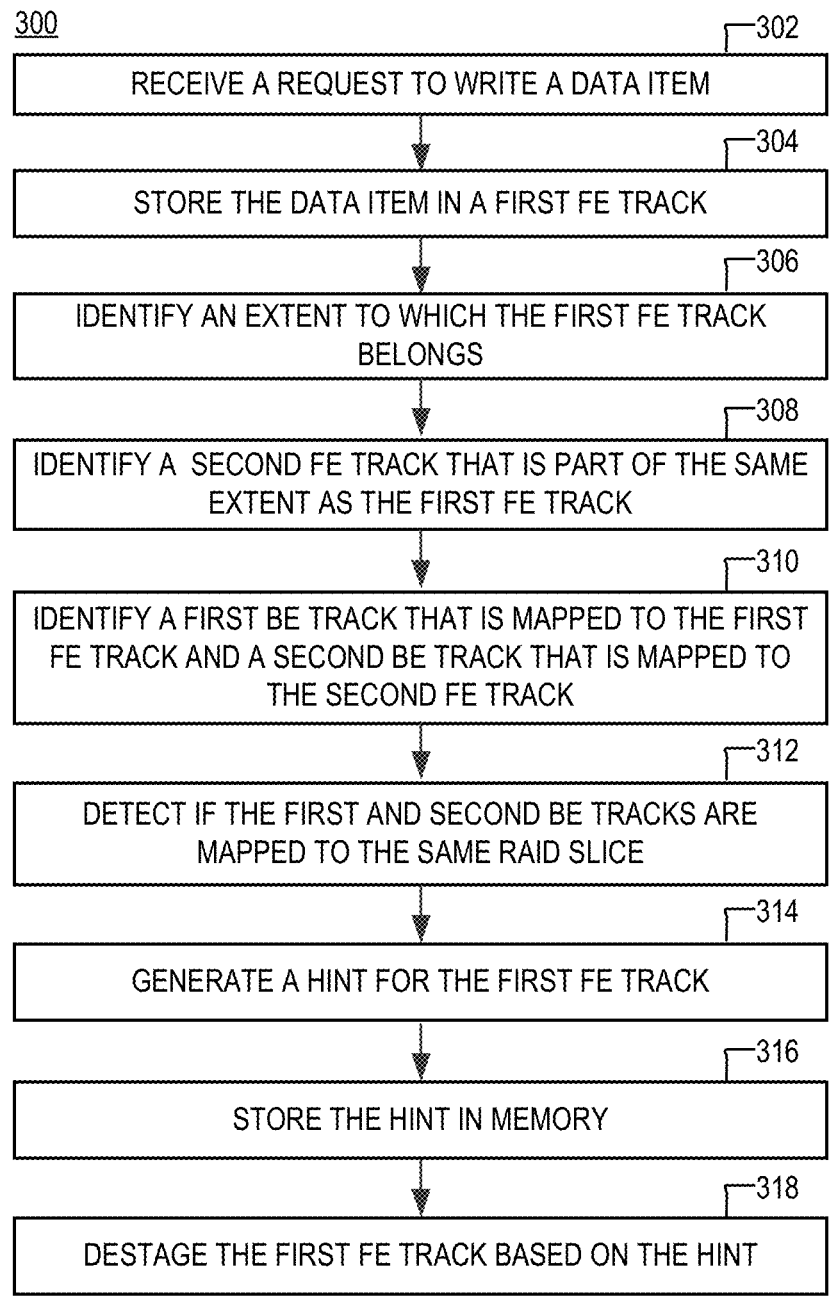
FIG. 3 is a flowchart of an example of a process, according to aspects of the disclosure.

FIG. 3 is a flowchart of an example of a process 300, according to aspects of the disclosure. According to the present example, process 300 is performed by one of the FE directors 181 (hereinafter "the given FE director"), a given one of the DS directors 183 (hereinafter the given DS director), and one of the BE directors 184 (hereinafter "the given BE director).

At step 302, the given FE director receives a request to write a data item. At step 304, the given FE director stores the data item in a first FE track in GM 142. At step 306, the given FE director identifies an extent to which the first FE tracks belongs. At step 308, the given FE director identifies a second FE track that is part of the same extent as the first FE track and/or for which there is a write pending. By way of example, the second FE track may be a track that immediately precedes or immediately follows the first FE track, however the present disclosure is not limited thereto. Additionally or alternatively, the second FE track may be a write pending track. According to the present example, the second FE track immediately precedes or follows the first FE track if the two tracks have consecutive addresses. At step 310, the given FE director identifies a first BE track that is mapped to the first FE track by data structure 168. Furthermore, at step 310, the given FE detector identifies a second BE track that is mapped to the second BE track that is mapped by data structure 168 to the second FE track. At step 312, the given FE detector detects whether the first BE track and the second BE track are mapped to the same RAID slice. At step 314, the given FE detector generates a hint for the first FE track. As noted above, the hint may be a bit indicative of whether the first FE track is subject to a sequential write or a random write. According to the present example, if the first and second BE tracks are both mapped to the same RAID slice, the first track is considered to be subject to a sequential write. On the other hand, if the first and second BE tracks are mapped to different RAID slices, the first FE track is considered to be subject to a random write. As noted above, the hint may have a first value (e.g., '1') if the first FE track is subject to a sequential write and a second value (e.g., '0') if the first track is subject to a random write. At step 316, the given FE detector stores the hint in memory. According to the present example, storing the hint in memory may include updating the mask 207 in the extent object 205 for the extent of which the first FE track is part to include the hint. At stage 318, the given ED director destages the first track based on the hint. Specifically, the given ED detector retrieves the hint (e.g., from the extent object) and determines if the first FE track is subject to a random write or a sequential write based on the hint. If the first FE track is subject to a random write, the given ED director destages the first FE track by using a relocation write. Otherwise, if the first FE track is subject to a sequential write, the given DS director destages the first FE track by using an in-place write. In some implementations, to destage the first track, the given DS director may interact with the given BE director in the manner discussed with respect to FIG. 1F.

Figure 4:
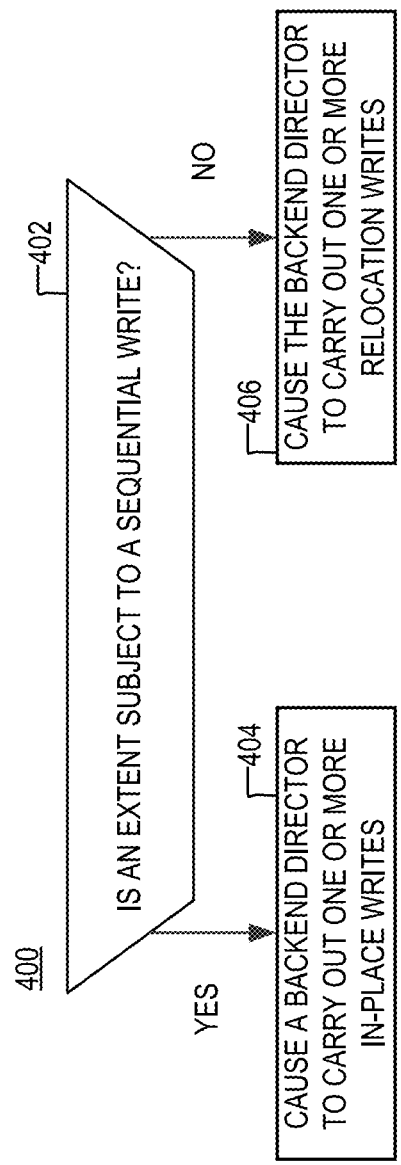
FIG. 4 is a flowchart of an example of a process, according to aspects of the disclosure.

FIG. 4 is a diagram of an example of a process 400, according to aspects of the disclosure. According to the present example, the process 400 is performed by a given one of the DS directors 183 (hereinafter "the given DS director"). However, the present disclosure is not limited to any specific entity performing the process 400.

At step 402, the given DS director determines whether an extent in GM 142 is subject to a sequential write or a random write. Determining whether the extent is subject to a sequential or random write includes: (i) identifying an extent object 205 that corresponds to the extent, (ii) retrieving the masks 204 and 207 from the extent object, (iii) determining a first count of writes pending in the extent based on mask 204, (iv) determining a second count of the writes pending that are considered sequential based on mask 207, and (v) determining based on the first count and the second count whether the extent is subject to a sequential write. According to the present example determining the first count of writes pending includes determining the count of bits in the mask 204 that are set to '1'. According to the present example, determining the second count of writes pending that are considered sequential includes determining a count of bits in mask 207 that are set to '1'. According to the present example, the extent is considered subject to a sequential by evaluating two different conditions, which are herein referred to as conditions 1 and condition 2. According to the present example, condition 1 is true if the first count is greater than a first threshold. According to the present example, Condition 2 is true if the second count is greater than a second threshold. If both conditions 1 and 2 are true, the given DS director determines that the extent is subject to a sequential write, and the process 400 proceeds to step 404. If at least one of conditions 1 and 2 is false, the given DS director determines that the extent is subject to a random write and process 400 proceeds to step 406.

At step 404, the given DS director executes all writes pending in the extent by using an in-place write. At step 406, the given DS director executes at least some of the writes pending in the extent by using a relocation write. As used herein the phrase of "executing a write pending in an extent" refers to destaging any of the FE tracks in the array for which there is a write pending to the RAID array 103.

In some implementations, the storage system 133 may be biased towards a configuration in which the tracks in each extent of GM 142 are stored in the same RAID slice. This relationship may be inherent in: (i) the tendency to map FE tracks to BE tracks in sequence when storage system 133 is first started, and (ii) the tendency of sequential BE tracks to be mapped to the same RAID slice. When FE tracks are mapped to BE tracks in sequence, FE track 1 may be mapped to BE track 1, FE track 2 may be mapped to BE track 2, FE track 3 may be mapped to FE track 3, and so forth. The bias towards the FE tracks in an extent being stored in the same RAID slice may start to break (or diminish) as time goes on due to the mapping between FE tracks and BE tracks changing or due to the mappings between BE tracks and RAID slices changing as a result of various processes that take place in the storage system 133, such as the execution of relocation writes, the performance of garbage collection, the performance of defragmentation, and so forth.

A definition is now provided of the ideas of "sequential write" and "random write'. In general, when the data stored in an FE track is part of a larger body of data that is being written to the RAID array 103 at roughly the same time, the FE track is said to be subject to a sequential write. On the other hand, if the opposite is true, the FE track is considered subject to a random write.

From the perspective of storage system 133, it may not be possible to determine with certainty if an FE track is subject to a sequential write or a random write. For this reason, the storage system 133 may resort to using various heuristics for detecting when an FE track is subject to a sequential or random write. FIGS. 3 and 4 provide an example of two such heuristics. In the example of FIG. 3, an FE track is considered to be subject to a sequential write if at least one other FE track that is part of the same extent, and for which there is a write pending, is mapped to the same RAID slice. In the example of FIG. 4, a given track is subject to a sequential write if there is a write pending for a predetermined number of tracks in the same extent which happen to be mapped to the same RAID slice. However, it is understood that the present disclosure is not limited to using any specific method (or heuristic) for determining whether an FE track is subject to a sequential or random write. In general, the type of method (or heuristic) used to identify sequential writes may depend on the application. For example, it may depend on the type of data that is being stored, the size of the storage system, the number and/or type of host devices that are writing to the storage system, and so forth.

In one example, detecting whether a first (write pending) FE track is subject to a sequential write or a random write may include detecting if there exists a predetermined number of write pending second FE tracks that are part of the same extent as the first FE track and which are mapped the same RAID slice as the first FE track. If such second FE tracks exist in the predetermined number (i.e., if such second FE tracks exist in sufficient numbers), the first FE track may be determined to be subject to a sequential write. Otherwise, if such second FE tracks do not exist at all, or do not exist in the predetermined number (i.e., do not exist in sufficient numbers), the first track may be deemed to be subject to a random write. The predetermined number may be any number greater than or equal to one.

In another example, detecting whether a first (write pending) FE track is subject to a sequential write or a random write may include detecting if there exists a second write pending FE track that is part of the same extent as the first FE track, such that the address of the second FE track is consecutive with the address of the first FE track and both the first and second FE tracks are mapped to the same RAID slice. If such second FE track exists, the first FE track may be determined to be subject to a sequential write. Otherwise, if no such second FE track exists, the first FE track may be deemed to be subject to a random write.

In yet another example, detecting whether a first (write pending) FE track is subject to a sequential write or a random write may include: (i) retrieving the extent object 205 for the extent of which the first FE track is part, (ii) retrieving one or both of the masks 204 and 207 that are part of the extent object, (iii) calculating a score based on the retrieved mask(s), (iv) comparing the score against a threshold, (v) terminating that the first FE track is subject to a sequential write when the score is above a threshold and determining that the first FE track is subject to a random write when the score is below the threshold. The present disclosure is not limited to any specific method for calculating the score. The score may be equal to or otherwise based on the count of bits in mask 207 that are set to '1'. Additionally or alternatively, the score may be equal to or otherwise based on the count of bits in mask 204 that are set to '1'. Additionally or alternatively, the score may be equal to or otherwise based on the sum of the count of bits in mask 204 that are set to '1' and the count of bits in mask 207 that are set to '1'.

The architecture discussed with respect to FIGS. 1A-4 possesses several adaptations that are not found in many conventional systems. For example, in the architecture discussed with respect to FIGS. 1A-4, the frontend of storage system 133 is configured to perform additional processing to determine whether each FE track that is cached in GM 142 is subject to a sequential write or a random write. As another example, the metadata used to manage the cache of the storage system (e.g., extent objects 205 which are used to manage the GM 142) is configured to include a respective hint for each of the FE tracks that belong to the cache which identifies whether the FE track is subject to a sequential or random write. As yet another example, the DS 143 and/or BE 144 are configured to take into consideration the respective hint for one or more of the FE tracks when deciding whether to destage the tracks by using an in-place write or a relocation write.

These adaptations enable storage system 133 to implement heuristics for distinguishing between FE tracks that are subject to sequential writes and FE tracks that are subject to random writes, which in turn enables storage system 133 to select what is expected to be the most efficient way of destaging the cached data (i.e., the data in the FE tracks) to the RAID array 103 (i.e., to determine whether the FE tracks need to be destaged by using an in-place write or a relocation write).

Although, in the example of FIGS. 1A-4, each hint is a single bit, in alternative implementations the hint that is generated for any of the FE tracks in storage system 133 may include one or more of a string, a number, or an alphanumerical string. As used herein, the term "write pending FE track" refers to a track that is currently used to cache data which has not be stored in permanent storage (e.g., RAID array 103, etc.). Similarly, the term "write pending" refers to a destage operation that has not be performed yet, but which needs to be performed, and which involves the copying to permanent storage (e.g., RAID array 103) of data that is currently cached in an FE track.

As used throughout the disclosure the term "destaging service" refers to one or more processes that are configured to perform or otherwise participate in the destaging of data from the FE tracks in storage system 133 to the RAID array 133. In the example, of FIGS. 1A-4, DS 143 is the destaging service of storage system 133. Although, in the example of FIGS. 1A-4, the destaging service is provided as a separate layer between the frontend 141 and the backend 143, in alternative implementations the destaging service may be integrated into one of the 141 and 143. The term "service" as used in the phrase "destaging service" does not imply that destaging service is implemented in a certain way. For example, the destaging service may be implemented as software or process that is runs in the backgraound, a kernel component, and/or any other suitable type of software and/or hardware component.

According to the present disclosure, it has been determined that the above adaptations, as well as the methods and techniques described throughout the disclosure, are advantageous because they result in reduced DA reads for repeated XOR operations, improved DA throughput and reduced latency bottlenecks, reduced number of write destage tasks, better CPU utilization, and improved I/O performance benchmarks of storage system 133.

Figure 5:
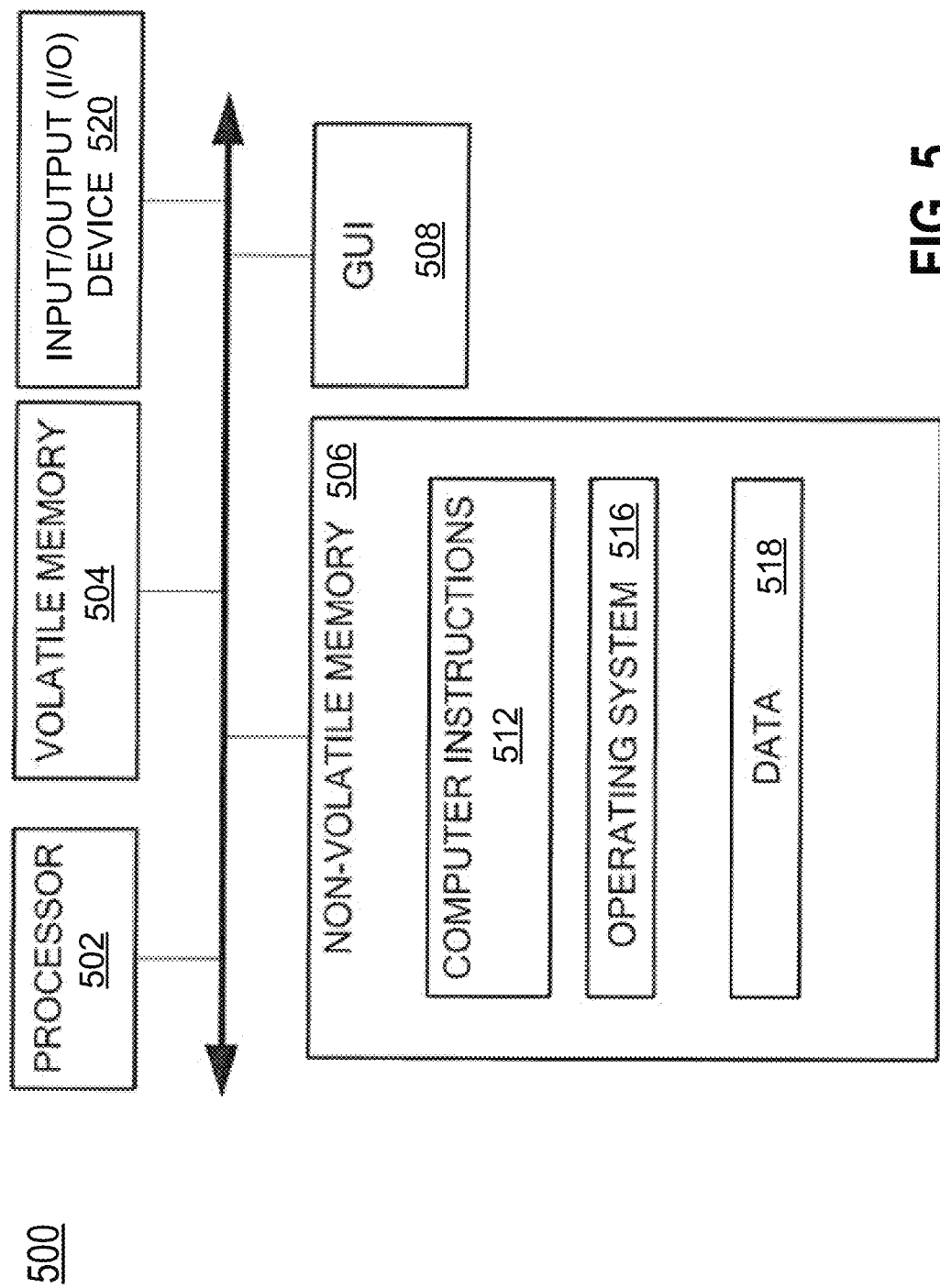
FIG. 5 is a diagram of an example of a computing device, according to aspects of the disclosure.

Referring to FIG. 5, in some embodiments, a device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1-5 are provided as an example only. In some embodiments, the term "I/O request" or simply "I/O" may be used to refer to an input or output request. At least some of the steps discussed with respect to FIGS. 1-5 may be performed in a different order or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. The acronym RAID, as used throughout the disclosure, means "Redundant Array of Independent Disks".

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. (1/23)

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method, comprising:
identifying a first front-end (FE) track that is arranged to cache data associated with one or more write requests, the first FE track being managed by a frontend of a storage system;
detecting whether the first FE track is subject to a sequential write or a random write;
generating a hint indicating whether the first FE track is subject to a sequential write or a random write;
providing the hint from the frontend of the storage system to a destaging service of the storage system;
selecting, by the destaging service of the storage system, a type of write operation for destaging the first FE track, the selected type of write operation being one of an in-place write or a relocation write; and
destaging the first FE track by executing the selected type of write operation,
wherein destaging the first FE track by executing an in-place write includes identifying a first backend (BE) track that is currently mapped by a metadata object to the first FE track and destaging the first FE track by using the first BE track, and
wherein destaging the first FE track by executing a relocation write includes: replacing, in the metadata object, a mapping between the first FE track and the first BE track with a mapping between the first FE track and a second BE track and destaging the first FE track by using the second BE track.

2. The method of claim 1, wherein destaging the first track includes copying the data from the first FE track into a Redundant Array of Independent Disks (RAID) array.

3. The method of claim 2, wherein destaging the first track by using the first BE track includes storing the data in a first slice in the RAID array that is mapped to the first FE track, and destaging the first BE track by using the second BE track includes storing the data in a second slice in the RAID array that is mapped to the second BE track.

4. The method of claim 1, wherein providing the hint to the destaging service includes storing the hint in an extent object that corresponds to an extent of which the first FE track is part.

5. The method of claim 1, wherein providing the hint to the destaging service of the storage system incudes providing the hint as part of an instruction to destage the first FE track.

6. The method of claim 1, wherein the detecting of whether the first FE track is subject to a sequential write or a random write includes evaluating a condition that is based on the count of hints in a hint mask of an extent object that corresponds to an extent of which the first FE track is part.

7. The method of claim 1, wherein:
the detecting of whether the first FE track is subject to a sequential write or a random write includes detecting a count of one or more second write pending FE tracks that are part of a same extent as the first FE track, detecting that the first FE track is subject to a sequential write when the count is above a threshold value, and detecting that the first FE track is subject to a random write if the count is below the threshold value, and
the second FE tracks are FE tracks for which there is a write pending and which are mapped to the same RAID slice as the first FE track.

8. The method of claim 1, wherein the detecting of whether the first FE track is subject to a sequential write or a random write includes:
detecting whether there exists at least one second FE track that is part of a same extent as the first FE track and for which there is a write pending,
detecting that the first FE track is subject to a sequential write when at least one such second FE track exists, and
detecting that the first FE track is subject to a random write when no such second FE tracks exist.

9. The method of claim 1, wherein the second FE track has a second address that immediately precedes or immediately follows a first address of the first FE track.

10. A system, comprising:
a memory; and
at least one processor that is operatively coupled to the memory, the at least one processor being configured to perform the operations of:
identifying a first front-end (FE) track that is arranged to cache data associated with one or more write requests, the first FE track being managed by a frontend of a storage system;
detecting whether the first FE track is subject to a sequential write or a random write;
generating a hint indicating whether the first FE track is subject to a sequential write or a random write;
providing the hint from the frontend of the storage system to a destaging service of the storage system;

selecting, by the destaging service of the storage system, a type of write operation for destaging the first FE track, the selected type of write operation being one of an in-place write or a relocation write; and
destaging the first FE track by executing the selected type of write operation,
wherein destaging the first FE track by executing an in-place write includes identifying a first backend (BE) track that is currently mapped by a metadata object to the first FE track and destaging the first FE track by using the first BE track, and
wherein destaging the first FE track by executing a relocation write includes: replacing, in the metadata object, a mapping between the first FE track and the first BE track with a mapping between the first FE track and a second BE track and destaging the first FE track by using the second BE track.

11. The system of claim 10, wherein destaging the first track includes copying the data from the first FE track into a Redundant Array of Independent Disks (RAID) array.

12. The system of claim 11, wherein destaging the first track by using the first BE track includes storing the data in a first slice in the RAID array that is mapped to the first FE track, and destaging the first BE track by using the second BE track includes storing the data in a second slice in the RAID array that is mapped to the second BE track.

13. The system of claim 10, wherein providing the hint to the destaging service includes storing the hint in an extent object that corresponds to an extent of which the first FE track is part.

14. The system of claim 10, wherein providing the hint to the destaging service of the storage system incudes providing the hint as part of an instruction to destage the first FE track.

15. The system of claim 10, wherein the detecting of whether the first FE track is subject to a sequential write or a random write includes evaluating a condition that is based on the count of hints in a hint mask of an extent object that corresponds to an extent of which the first FE track is part.

16. The system of claim 10, wherein:
the detecting of whether the first FE track is subject to a sequential write or a random write includes detecting a count of one or more second write pending FE tracks that are part of a same extent as the first FE track, detecting that the first FE track is subject to a sequential write when the count is above a threshold value, and detecting that the first FE track is subject to a random write if the count is below the threshold value, and
the second FE tracks are FE tracks for which there is a write pending and which are mapped to the same RAID slice as the first FE track.

17. The system of claim 10, wherein the detecting of whether the first FE track is subject to a sequential write or a random write includes:
detecting whether there exists at least one second FE track that is part of a same extent as the first FE track and for which there is a write pending,
detecting that the first FE track is subject to a sequential write when at least one such second FE track exists, and
detecting that the first FE track is subject to a random write when no such second FE tracks exist.

18. The system of claim 10, wherein the second FE track has a second address that immediately precedes or immediately follows a first address of the first FE track.

19. A non-transitory computer-readable medium storing one or more processor-executable instructions, which, when executed by at least one processor, cause the at least one processor to perform the operations of:
identifying a first front-end (FE) track that is arranged to cache data associated with one or more write requests, the first FE track being managed by a frontend of a storage system;
detecting whether the first FE track is subject to a sequential write or a random write;
generating a hint indicating whether the first FE track is subject to a sequential write or a random write;
providing the hint from the frontend of the storage system to a destaging service of the storage system;
selecting, by the destaging service of the storage system, a type of write operation for destaging the first FE track, the selected type of write operation being one of an in-place write or a relocation write; and
destaging the first FE track by executing the selected type of write operation, wherein destaging the first FE track by executing an in-place write includes identifying a first backend (BE) track that is currently mapped by a metadata object to the first FE track and destaging the first FE track by using the first BE track, and
wherein destaging the first FE track by executing a relocation write includes: replacing, in the metadata object, a mapping between the first FE track and the first BE track with a mapping between the first FE track and a second BE track and destaging the first FE track by using the second BE track.

20. The non-transitory computer-readable medium of claim 19, wherein destaging the first track includes copying the data from the first FE track into a Redundant Array of Independent Disks (RAID) array.

* * * * *